United States Patent
Silverstein

(10) Patent No.: US 10,979,685 B1
(45) Date of Patent: Apr. 13, 2021

(54) FOCUSING FOR VIRTUAL AND AUGMENTED REALITY SYSTEMS

(71) Applicant: Apple Inc., Cupertino, CA (US)

(72) Inventor: D. Amnon Silverstein, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 70 days.

(21) Appl. No.: 15/965,539

(22) Filed: Apr. 27, 2018

Related U.S. Application Data

(60) Provisional application No. 62/491,968, filed on Apr. 28, 2017.

(51) Int. Cl.
 *H04N 13/117* (2018.01)
 *G02B 27/01* (2006.01)
 *G06F 3/01* (2006.01)

(52) U.S. Cl.
 CPC ....... *H04N 13/117* (2018.05); *G02B 27/0172* (2013.01); *G06F 3/013* (2013.01)

(58) Field of Classification Search
 CPC .......................... G02B 27/0172; H04N 13/117
 USPC .......................................................... 345/8
 See application file for complete search history.

(56) References Cited

U.S. PATENT DOCUMENTS

| 9,588,341 | B2 | 3/2017 | Bar-Zeev et al. | |
|---|---|---|---|---|
| 2012/0001901 | A1 | 1/2012 | Park | |
| 2012/0249797 | A1* | 10/2012 | Haddick | G06F 3/016 |
| | | | | 348/158 |
| 2012/0250152 | A1* | 10/2012 | Larson | G02B 30/24 |
| | | | | 359/464 |
| 2013/0088413 | A1 | 4/2013 | Raffle et al. | |
| 2015/0003819 | A1* | 1/2015 | Ackerman | H04N 5/23218 |
| | | | | 396/51 |
| 2015/0153572 | A1* | 6/2015 | Miao | G02B 27/017 |
| | | | | 345/8 |
| 2016/0327793 | A1 | 11/2016 | Chen et al. | |
| 2017/0160798 | A1* | 6/2017 | Lanman | G02B 27/0172 |
| 2018/0114288 | A1* | 4/2018 | Aldaz | G06Q 10/10 |

* cited by examiner

*Primary Examiner* — Mark Edwards
(74) *Attorney, Agent, or Firm* — Robert C. Kowert; Kowert, Hood, Munyon, Rankin & Goetzel, P.C.

(57) ABSTRACT

Methods and apparatus for focusing in virtual reality (VR) or augmented reality (AR) devices based on gaze tracking information are described. Embodiments of a VR/AR head-mounted display (HMD) may include a gaze tracking system for detecting position and movement of the user's eyes. For AR applications, gaze tracking information may be used to direct external cameras to focus in the direction of the user's gaze so that the cameras focus on objects at which the user is looking. For AR or VR applications, the gaze tracking information may be used to adjust the focus of the eye lenses so that the virtual content that the user is currently looking at on the display has the proper vergence to match the convergence of the user's eyes.

19 Claims, 13 Drawing Sheets

FOCUSING FOR VIRTUAL AND AUGMENTED REALITY SYSTEMS

This application claims benefit of priority to U.S. Provisional Application Ser. No. 62/491,968, entitled "FOCUSING FOR VIRTUAL AND AUGMENTED REALITY SYSTEMS," filed Apr. 28, 2017, and which is incorporated herein by reference in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) or augmented reality (AR) systems combine computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for focusing in virtual reality (VR) or augmented reality (AR) devices based on gaze tracking information are described. Embodiments of a VR/AR device such as a headset, helmet, goggles, or glasses (referred to herein as a head-mounted display (HMD)) are described that include a display, left and right optical lenses (referred to herein as eye lenses) located between the display and the user's eyes, and a controller. For AR applications, the HMD may include or be coupled to one or more external video cameras that capture video of the user's environment for display. The external cameras may include an autofocus mechanism that allows the cameras to automatically focus on objects or surfaces in the environment. A gaze tracking system may be included in the HMD for detecting position and movement of the user's eyes.

In conventional AR HMDs, the autofocus mechanism may focus on something that the user is not looking at. In embodiments of an HMD as described herein, for AR applications, the controller may use the gaze tracking information obtained from the gaze tracking system to direct the autofocus mechanism of the external cameras to focus in the direction of the user's gaze so that the external cameras focus on objects in the environment at which the user is currently looking.

In embodiments, for AR or VR applications, the eye lenses may be focusable lenses, and the HMD may use the gaze tracking information to adjust the focus of the eye lenses so that the virtual content that the user is currently looking at has the proper vergence to match the convergence of the user's eyes. The controller may leverage the gaze tracking information to direct the eye lenses to adjust focus so that close objects that the user is looking at appear at the right distance. For closed-circuit AR applications, the eye lenses can be focused to adjust the display vergence to agree with focus of the external cameras. For VR applications, the controller may obtain distance information for virtual content to be displayed on the display panels, and may use this distance information to direct the eye lenses to adjust focus according to the distance of virtual content that the user is currently looking at according to the gaze tracking information.

In some embodiments, adjusting focus of the eye lenses may be applied during playback of recorded video. Depth information may be recorded with the video, or may be derived from the computer graphics. The gaze tracking information may be used to determine the direction of the user's gaze during playback of the video, and the gaze direction can be used to determine depth at the place where the user's gaze is directed. The eye lenses can then be adjusted to provide the appropriate vergence for the part of the scene that the user is looking at.

Figure 1A:
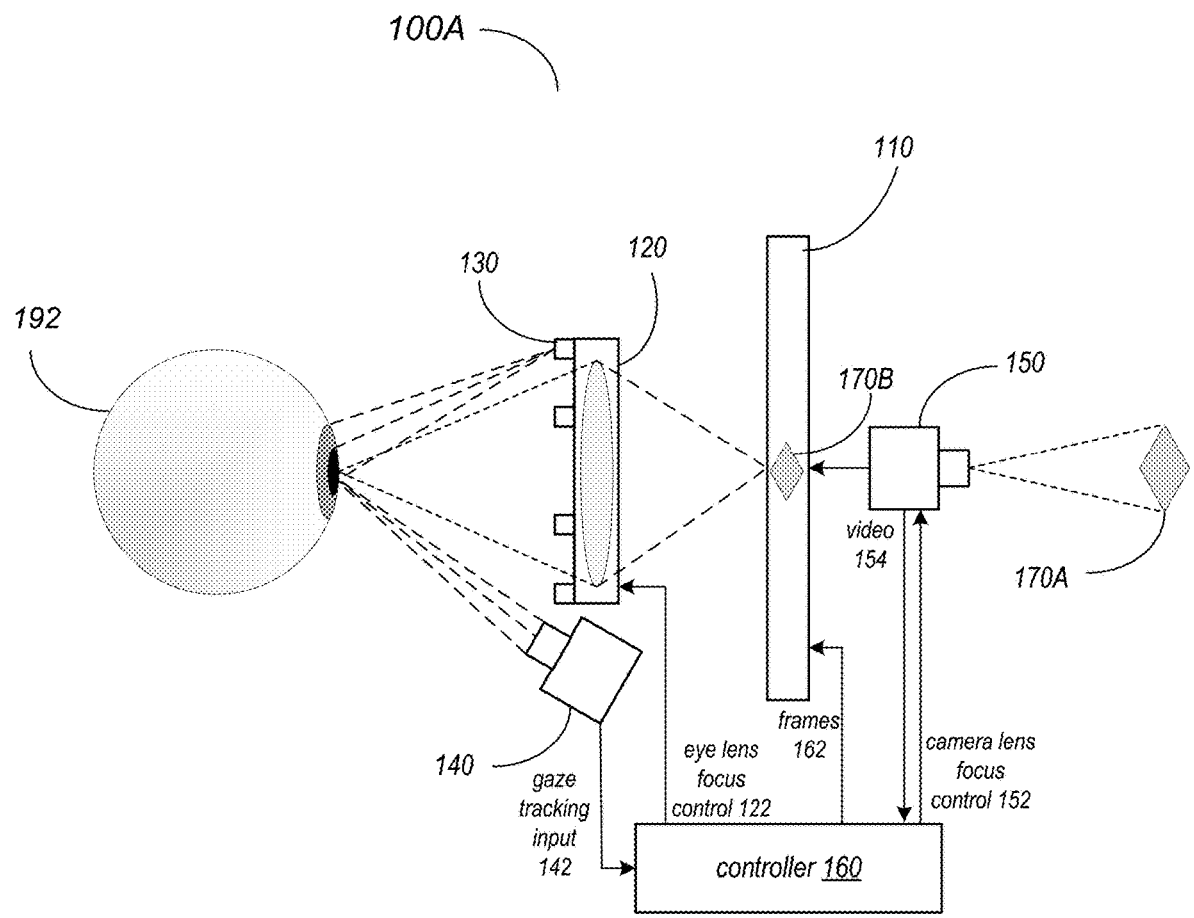
FIGS. 1A and 1B illustrate focusing external cameras in augmented reality (AR) head-mounted displays (HMDs) based at least in part on gaze tracking information, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for focusing in virtual reality (VR) or augmented reality (AR) devices based on gaze tracking information are described. Embodiments of a VR/AR device such as a headset, helmet, goggles, or glasses (referred to herein as a head-mounted display (HMD)) are described that include a display mechanism (e.g., left and right near-eye display panels) for displaying frames including left and right images in front of a user's eyes to thus provide 3D virtual views to the user. The HMD may include left and right optical lenses (referred to herein as eye lenses) located between the display and the user's eyes. For AR applications, the HMD may include or be coupled to one or more external video cameras that capture video of the user's environment for display. The HMD may include a controller that may, for example, render frames for display to the left and right displays.

In embodiments, a gaze tracking system may be included in the HMD for detecting position and movement of the user's eyes. In some embodiments, the gaze tracking system may include at least one eye tracking camera (e.g., infrared (IR) or near-IR (NIR) cameras) positioned at each side of the user's face, and an illumination source (e.g., an IR or NIR light source) that emits light (e.g., IR or NIR light) towards the user's eyes. The eye tracking cameras may be pointed towards the user's eyes to receive reflected IR or NIR light from the eyes, or alternatively may be pointed towards mirrors located between the user's eyes and the display panels that reflect IR or NIR light from the eyes while allowing visible light to pass.

As noted above, AR HMDs have external cameras linked to closed circuit display panels. Note that the external cameras may be attached to the HMD, or alternatively may be at a remote location for telepresence applications. The external cameras may include an autofocus mechanism that allows the cameras to automatically focus on objects or surfaces in the environment. However, in conventional HMDs, the autofocus mechanism may focus on something that the user is not looking at. In embodiments of an HMD as described herein, for AR applications, the controller may use the gaze tracking information obtained from the gaze tracking system to direct the autofocus mechanism of the external cameras to focus in the direction of the user's gaze so that the external cameras focus on objects in the environment at which the user is currently looking. The controller may estimate the user's point of gaze on the display based on the gaze tracking information obtained from the gaze tracking system. The point of gaze estimated from the information captured by the gaze tracking system may be used to determine the direction in which the user is looking. The controller may then direct the external cameras to focus in the determined direction. The autofocus mechanism of the external cameras may then focus the camera lenses on an object or surface in the environment that the user is currently looking at on the display.

As noted above, an HMD may include left and right eye lenses located between the display and the user's eyes. Conventionally, the eye lenses form a virtual image of the content displayed on the display panels at a design distance which is typically close to optical infinity of the eye lenses. However, a problem in VR and AR systems is the vergence/convergence mismatch problem. Objects displayed by the VR or AR system may appear to the user to be at different distances. When looking at a particular virtual object, the user's eyes may automatically converge (toe-in) to point towards the target object; the eyes converge more for objects that appear to be close to the user's face, and less for objects that appear to be farther away. The user's eyes automatically adjust focus to match the apparent distance of the object that the user is looking at. However, the virtual objects are actually displayed on the flat display panels, so the convergence (the toe-in of the eyes) and the optical vergence (the effective optical distance of the display) do not agree, which may cause eye strain.

In embodiments of an HMD as described herein, for AR or VR applications, the eye lenses may be focusable lenses, and the HMD may use the gaze tracking information to adjust the focus of the eye lenses so that the virtual content that the user is currently looking at has the proper vergence to match the convergence of the user's eyes. The controller may leverage the gaze tracking information to direct the eye lenses to adjust focus so that close objects that the user is looking at appear at the right distance.

For closed-circuit AR applications, the eye lenses can be focused to adjust the display vergence to agree with focus of the external cameras. For example, in an HMD with external cameras that provide a closed circuit video feed to the display panels, if the external cameras are focusing on a near object, the eye lenses can be adjusted to generate near vergence. In some embodiments, the controller may direct the external cameras to focus in the direction determined from the gaze tracking information. The controller may obtain focus information as feedback from the autofocus mechanism of the external cameras, and use this focus information to determine distance of an object that the user is looking at. The controller may then direct the eye lenses to adjust focus according to the determined distance.

In some AR systems, virtual content may be overlaid on the user's view of the real environment. For example, virtual content may be overlaid on an object that appears in the user's view of the real environment. In some embodiments, the gaze tracking information may be applied to both the live video of the environment captured by the external cameras and the overlaid virtual content to determine the focus positions that provide correct vergence. For example, if the virtual content is at a virtual distance that is closer than the real object distance, the eye lenses may be adjusted to the vergence of the virtual content. The controller may obtain distance information for virtual content to be overlaid on the user's view of the real environment, and may use this distance information to direct the eye lenses to adjust focus according to the distance of virtual content that the user is currently looking towards according to the gaze tracking information.

For VR applications, the controller may obtain distance information for virtual content to be displayed on the display panels, and may use this distance information to direct the eye lenses to adjust focus according to the distance of virtual content that the user is currently looking at according to the gaze tracking information.

In some embodiments, adjusting focus of the eye lenses of the HMD to provide correct vergence for content that the user is looking at as determined from the gaze tracking information may be applied during playback of recorded video. Depth information may be recorded with the video, or may be derived from the computer graphics. The gaze tracking information may be used to determine the direction of the user's gaze during playback of the video, and the gaze direction can be used to determine depth at the place where the user's gaze is directed. The eye lenses can then be adjusted to provide the appropriate vergence for the part of the scene that the user is looking at.

For example, in some embodiments of an AR system as described herein, an AR session may be recorded as a video stream, for example to an external device, for later playback. The external camera focus information may be recorded with the video stream. During playback of the video, the user's gaze may be tracked, and the recorded external camera focus information may be used to adjust the focus of the eye lenses to provide the correct vergence for displayed objects. Note that this method may be applied to any video recorded for viewing by an HMD as described herein; camera focus information may be recorded with the video, and used by the HMD to provide correct vergence for objects that appear in the video.

In some embodiments, instead of or in addition to recording camera focus information with a recorded video stream, eye lens focus information may be recorded with the video stream; the eye lens focus information may then be used during playback to provide correct vergence for objects that appear in the video.

While embodiments of a gaze tracking system for HMDs are generally described herein as including at least one eye tracking camera positioned at each side of the user's face to track the gaze of both of the user's eyes, a gaze tracking system for HMDs may also be implemented that includes at least one eye tracking camera positioned at only one side of the user's face to track the gaze of only one of the user's eyes.

Figure 1B:
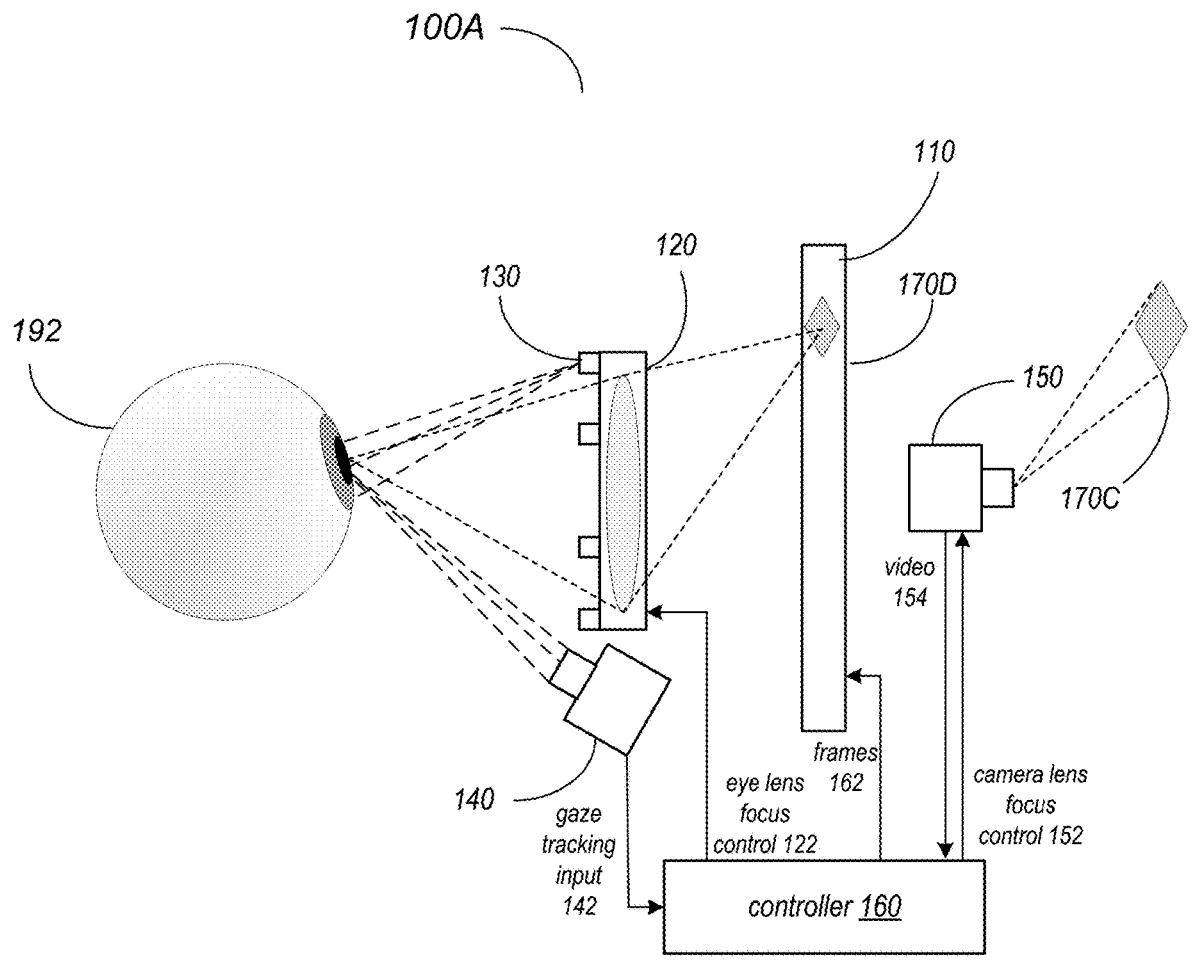
Figure 1C:
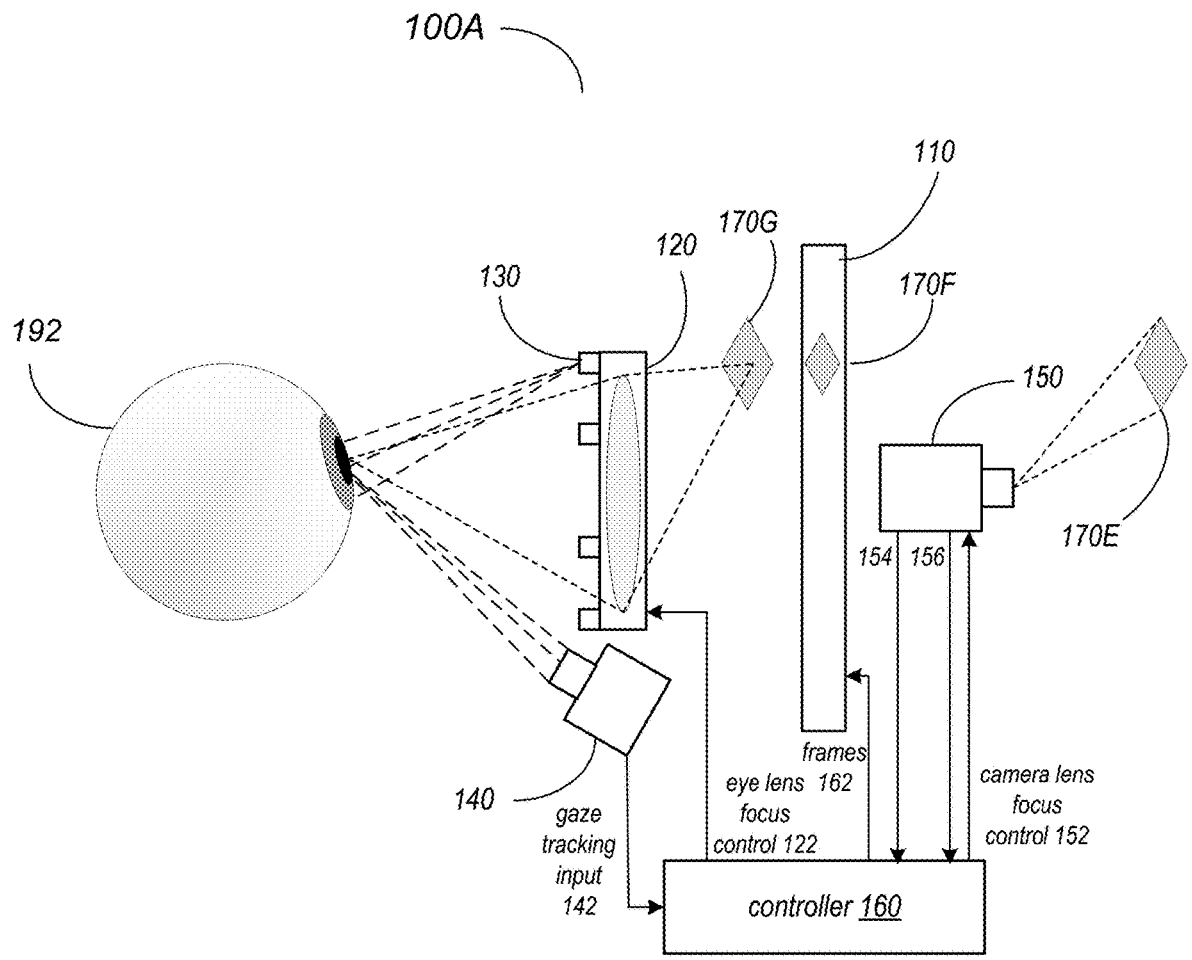
FIG. 1C illustrates focusing eye lenses in AR HMDS based at least in part on gaze tracking information, according to some embodiments.
Figure 1D:
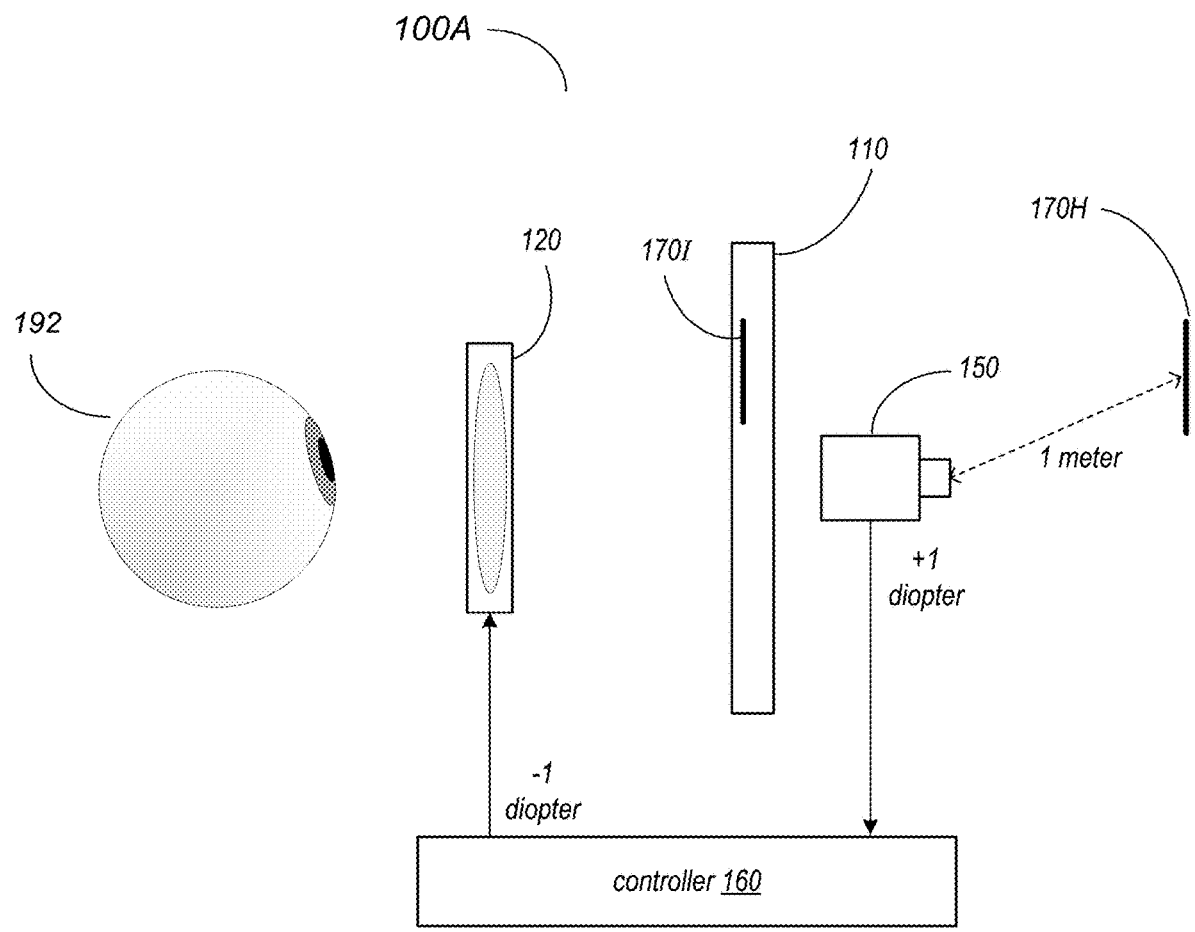
FIG. 1D illustrates an example of adjusting focus of the eye lenses of an AR HMD according to focus distance of the external cameras, according to some embodiments.
Figure 1E:
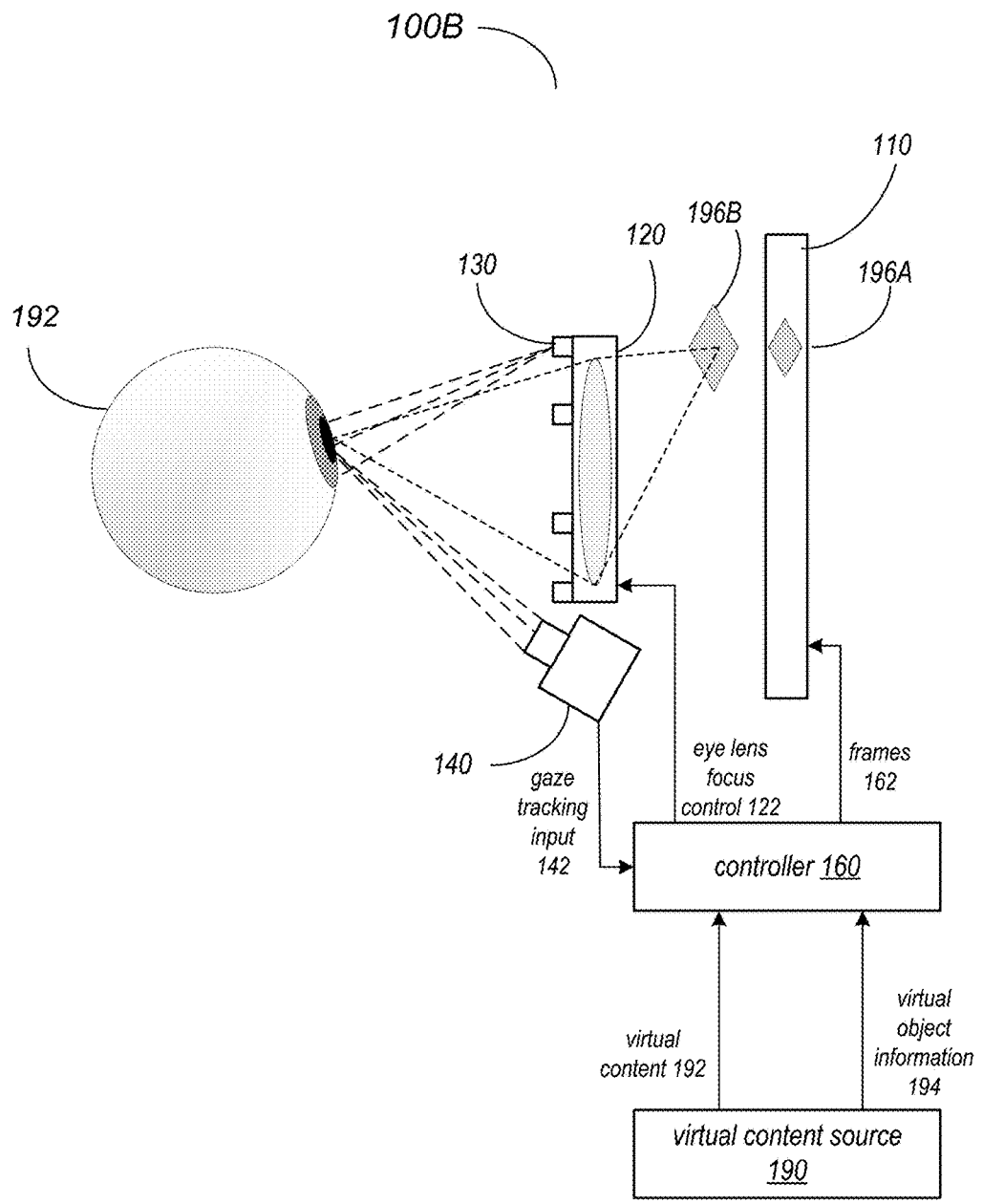
FIG. 1E illustrates focusing eye lenses in VR HMDS based at least in part on gaze tracking information, according to some embodiments.

FIGS. 1A through 1E graphically illustrate focusing in VR/AR HMDs based at least in part on gaze tracking information, according to some embodiments. FIGS. 1A through 1D illustrate focusing in AR applications, while FIG. 1E illustrates focusing in VR or video playback applications.

As illustrated in FIGS. 1A through 1C, an AR HMD 100A may include, but is not limited to, a display 110 (e.g., a left and right display panel), two eye lenses 120, and one or more external cameras 150 mounted in or on a wearable housing. The HMD 100A may also include a gaze tracking system that includes at least one eye tracking camera 140 (e.g., infrared (IR) or near-IR (NIR) cameras) positioned at each side of the user's face, and an illumination source 130 (e.g., an IR or NIR light source such as an array of NIR light-emitting diodes) that emits light (e.g., IR or NIR light) towards the user's eyes 192. The eye tracking cameras 140 may be pointed towards the user's eyes 192 to receive reflected IR or NIR light from the eyes 192 as shown in FIGS. 1A through 1C, or alternatively may be pointed towards mirrors (not shown) located between the user's eyes 192 and the display 110 that reflect IR or NIR light from the eyes 192 while allowing visible light to pass.

The external cameras 150 capture video 154 of the user's environment for display. Note that the external cameras 150 may be attached to the HMD 100A, or alternatively may be at a remote location for telepresence applications. The HMD 100A may include a controller 160 that may, for example, receive video 154 from cameras 150, render frames 162 (e.g., left and right frames for left and right display panels) based at least in part on the video 154 and provide the frames 162 to the display 110. In some embodiments, the controller 160 may be integrated in the HMD 100A. In some embodiments, at least some of the functionality of the controller 160 may be implemented by a device external to the HMD 100A and coupled to the HMD 100A by a wired or wireless connection. The user looks through the eye lenses 120 onto the display 110 (e.g., on to left and right display panels through left and right lenses 120).

The external cameras 150 may include an autofocus mechanism that allows the cameras 150 to automatically focus on objects or surfaces in the environment. However, in conventional HMDs, the autofocus mechanism may focus on something that the user is not looking at on the display 110. In embodiments of an AR HMD 100A, the controller 160 may use gaze tracking input 142 from the eye tracking cameras 140 to direct the autofocus mechanism of the external cameras 150 to focus in the direction of the user's gaze so that the external cameras 150 focus on objects in the environment at which the user is currently looking. The controller 160 may estimate the user's point of gaze on the display 110 based on the gaze tracking input 142 obtained from the eye tracking cameras 140. The point of gaze estimated from the gaze tracking input 142 may be used to determine the direction in which the user is currently looking. The controller 160 may then direct 152 the external cameras 150 to focus in the determined direction. The autofocus mechanism of the external cameras 150 may then focus on an object or surface in the environment that the user is currently looking at on the display 110.

For example, as shown in FIG. 1A, the gaze tracking input 142 may indicate that the user's eyes 192 are currently looking towards a virtual object 170B on display 110 corresponding to a real object 170A in the user's environment. The controller 160 may direct 152 the external cameras 150 to focus in the determined direction so that the external cameras 150 focus on the object 170A. As shown in FIG. 1B, the user may move their eyes 192 to instead look in the direction of a virtual object 170D on display 110 corresponding to a real object 170C in the user's environment. The controller 160 may direct 152 the external cameras 150 to refocus in the direction of object 170C so that the external cameras 150 focus on the object 170C.

FIG. 1C graphically illustrates focusing the eye lenses 120 of an AR HMD 100A so that a virtual image of an object appears at the correct vergence distance. Conventionally, the eye lenses 120 are focused so as to form a virtual image of an object at a design distance which is typically close to optical infinity of the eye lenses 120. However, the virtual objects are actually displayed on the flat display panels, so the convergence (the toe-in of the eyes) and the optical vergence (the effective optical distance of the display) may not agree, which may cause eye strain.

In embodiments of an HMD 100A, the eye lenses 120 may be focusable lenses, and the HMD 100A may use the gaze tracking information to adjust the focus of the eye lenses 120 so that the virtual object that the user is currently looking at has the proper vergence to match the convergence of the user's eyes 192. The controller 160 may leverage the gaze tracking information to direct the eye lenses 120 to adjust focus so that close objects that the user is looking at appear at the right distance.

For closed-circuit AR applications, the eye lenses 120 can be focused to adjust the display vergence to agree with focus of the external cameras 150. For example, in an HMD 110 with external cameras 150 that provide a closed circuit video feed to the display 110, if the external cameras 150 are focusing on a near object 170E in the user's environment, the focus of the eye lenses 120 can be adjusted to generate a virtual image of the object 170G that appears at the correct vergence distance. In some embodiments, the controller 160 may direct the external cameras 150 to focus in the direction of the object 170E as determined from the gaze tracking input 142 as described in reference to FIGS. 1A and 1B. The controller 160 may obtain focus information 156 as feedback from the autofocus mechanism of the external cameras 150, and use this focus information 156 to determine distance of an object 170E that the user is looking at. The controller 160 may then direct 122 the eye lenses 120 to adjust focus according to the determined distance. The displayed virtual object 170F then appears to the user at the correct vergence distance 170G.

FIG. 1D illustrates an example of adjusting the eye lenses 120 of an AR HMD according to focus distance of the external cameras 150, according to some embodiments. In a closed circuit video AR HMD 100A, external cameras 150 capture video of an environment that includes an object 170H. The video captured by cameras 150 is displayed on the display 110 panels. The controller 160 determines from gaze tracking information that the user is looking in the direction of the object 170I on display 110. The controller 160 directs the cameras 150 to focus in the determined direction. The cameras 150 adjust focus using an autofocus mechanism in the determined direction; since object 170H is in that direction, the cameras 150 focus on the object 170H. In this example, object 170H is 1 meter from the cameras 150; at 1 meter, the cameras 150 need to add 1 diopter of refractive power to focus on the object 170H so that a sharp, in-focus image of the object 170H is captured by the camera 150 sensors and shown as 170I) on the display 110. (A diopter is a unit of refractive power that is equal to the reciprocal of the focal length (in meters) of a given lens.) The cameras 150 may provide focus information as feedback to the controller 160, for example indicating the distance of the object 170H on which the cameras 150 are focused and/or the adjustment to the refractive power (+1 diopter, in this example). The eye lenses 120 may be adjustable lenses that form a virtual image of the content displayed on the display 110 panels at a distance which is typically close to optical infinity of the eye lenses 120. For example, in an HMD 100A where the display 110 is 1 cm away from the user's eyes 192, a 100 diopter lens 120 may be used to make the display 110 appear at optical infinity. To make the displayed object 170I appear to be 1 meter away instead of at optical infinity, the controller 160 may direct the eye lenses 120 to subtract 1 diopter of refractive power.

While FIGS. 1C and 1D show cameras 150 feeding back focus information to the controller 160 which then directs the eye lenses 120 to adjust focus accordingly, in some embodiments the cameras 150 may be directly linked to the eye lenses 120 and may provide the focus information directly to the eye lenses 120 to cause the eye lenses to dynamically adjust focus according to the current focus of the camera 150 lenses.

FIG. 1E graphically illustrates focusing the eye lenses 120 of a VR HMD 100B so that a virtual image of an object appears at the correct vergence distance. As illustrated in FIG. 1E, a VR HMD 100B may include, but is not limited to, a display 110 (e.g., a left and right display panel), and two eye lenses 120. The HMD 100B may also include a gaze tracking system that includes at least one eye tracking camera 140 (e.g., infrared (IR) or near-IR (NIR) cameras) positioned at each side of the user's face, and an illumination source 130 (e.g., an IR or NIR light source such as an array of NIR light-emitting diodes) that emits light (e.g., IR or NIR light) towards the user's eyes 192. The eye tracking cameras 140 may be pointed towards the user's eyes 192 to receive reflected IR or NIR light from the eyes 192 as shown in FIG. 1E, or alternatively may be pointed towards mirrors (not shown) located between the user's eyes 192 and the display 110 that reflect IR or NIR light from the eyes 192 while allowing visible light to pass.

The controller 160 may obtain virtual content 192 from a virtual content source 190 for display. Note that the virtual content source 190 may be integrated in the HMD 100B, or alternatively may be external to the HMD and coupled to the HMD 100B via a wired or wireless connection. The HMD 100B may include a controller 160 that may, for example, receive virtual content 192, render frames 162 (e.g., left and right frames for left and right display panels) based at least in part on the virtual content 192, and provide the frames 162 to the display 110. In some embodiments, the controller 160 may be integrated in the HMD 100B. In some embodiments, at least some of the functionality of the controller 160 may be implemented by a device external to the HMD 100B and coupled to the HMD 100B by a wired or wireless connection. To view the virtual content in 3D, the user looks through the eye lenses 120 onto the display 110 (e.g., on to left and right display panels through left and right lenses 120).

Conventionally, the eye lenses 120 are focused so as to form a virtual image of an object at a design distance which is typically close to optical infinity of the eye lenses 120. However, the virtual objects are actually displayed on the flat display panels, so the convergence (the toe-in of the eyes) and the optical vergence (the effective optical distance of the display) may not agree, which may cause eye strain.

In embodiments of a VR HMD 100B, the eye lenses 120 may be focusable lenses, and the HMD 100B may use the gaze tracking information to adjust the focus of the eye lenses 120 so that the virtual object that the user is currently looking at has the proper vergence to match the convergence of the user's eyes 192. The controller 160 may leverage the gaze tracking information to direct the eye lenses 120 to adjust focus so that close objects that the user is looking at appear at the right distance. For VR applications, the controller 160 may obtain virtual object information 194, for example from the virtual content source 199, that includes distance information for virtual objects (e.g., object 196A) to be displayed on the display panels, and may use this distance information to direct the eye lenses 120 to adjust focus according to the distance of the virtual object (e.g., object 196A) that the user is currently looking at as determined from the gaze tracking input 142 received from the eye tracking cameras 140. The displayed virtual object 196A then appears to the user at the correct vergence distance 196B.

As an example, the eye lenses 120 may be adjustable lenses that form a virtual image of the content displayed on the display 110 panels at a distance which is typically close to optical infinity of the eye lenses 120. For example, in an HMD 100B where the display 110 is 1 cm away from the user's eyes 192, a 100 diopter lens 120 may be used to make the display 110 appear at optical infinity. The distance of virtual object 196A may be determined to be 1 meter. To make the displayed object 196A appear to be 1 meter away instead of at optical infinity, the controller 160 may direct the eye lenses 120 to subtract 1 diopter of refractive power.

In some embodiments, adjusting focus of the eye lenses 120 of an HMD 100 to provide correct vergence for content that the user is looking at as determined from the gaze tracking information may be applied to recorded video. Depth information may be recorded with the video, or may be derived from the computer graphics. The gaze tracking information may be used to determine the direction of the user's gaze during playback of the video, and the gaze direction can be used to determine depth at the place where the user's gaze is directed. The eye lenses 120 can then be adjusted to provide the appropriate vergence for the part of the scene that the user is looking at.

Figure 2:
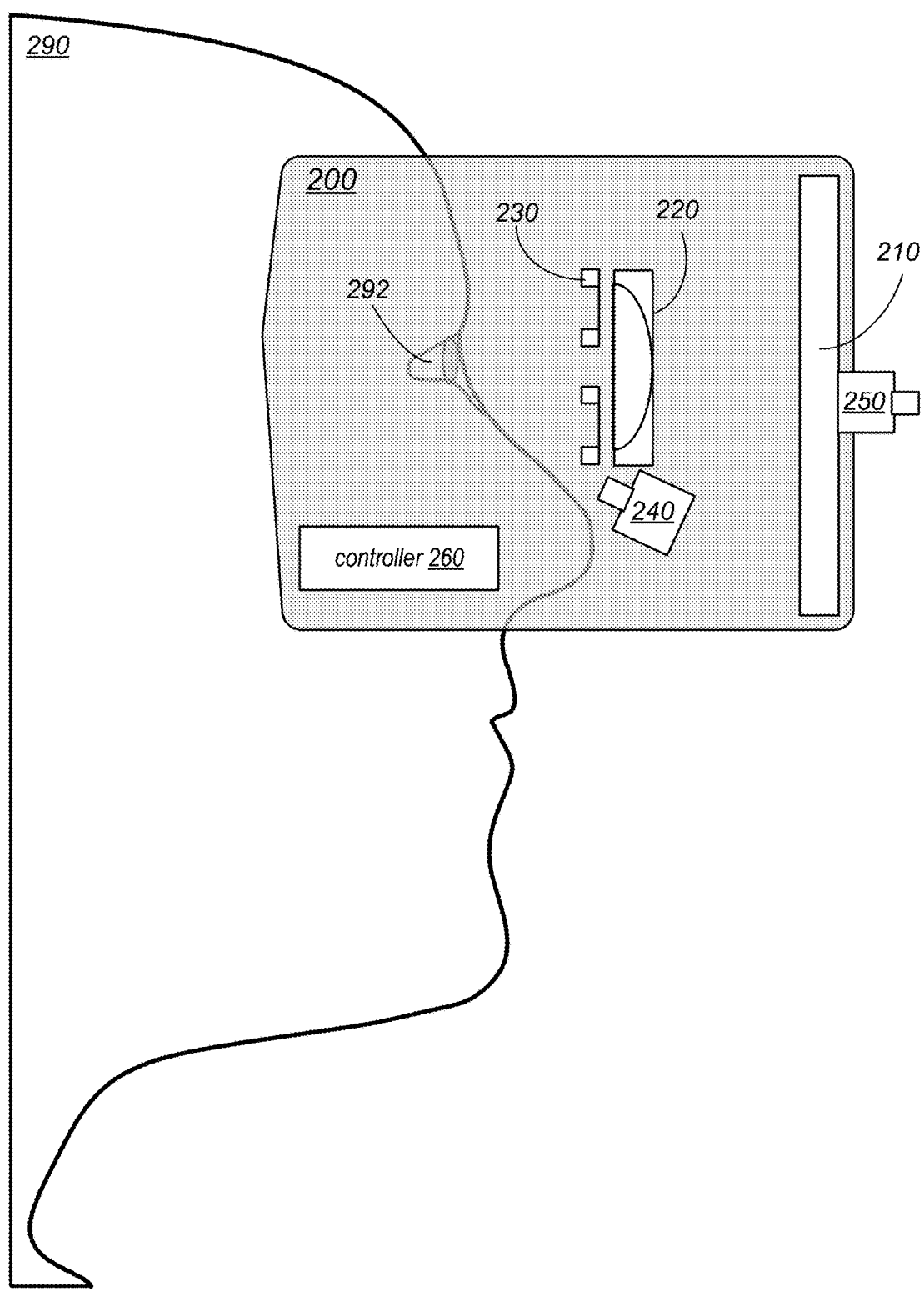
FIG. 2 shows a side view of an example HMD that implements a gaze tracking system, according to some embodiments.

FIG. 2 shows a side view of an example HMD 200 that implements a gaze tracking system as illustrated in FIGS. 1A through 1E, according to some embodiments. Note that HMD 200 as illustrated in FIG. 2 is given by way of example, and is not intended to be limiting. In various embodiments, the shape, size, and other features of an HMD 200 may differ, and the locations, numbers, types, and other features of the components of an HMD 200 may vary.

VR/AR HMD 200 may include a display 210, two eye lenses 220, eye tracking cameras 240 located at the sides of the user's face (e.g., at or near the user's cheek bones), and a light source 230, mounted in a wearable housing. The HMD 200 may include or be coupled to a controller 260. For AR applications, the HMD 200 may include one or more external cameras 250; the controller 260 may receive video from cameras 250, render frames (e.g., left and right frames for left and right display panels) based at least in part on the video, and provide the frames to the display 210. For VR applications, the controller 260 may receive virtual content from one or more sources, render frames (e.g., left and right frames for left and right display panels) based at least in part on the virtual content, and provide the frames to the display 210.

As shown in FIG. 2, HMD 200 may be positioned on the user 290's head such that the display 210 and eye lenses 220 are disposed in front of the user 290's eyes 292. The eye tracking cameras 240 maybe used to track position and movement of the user 290's eyes. IR or NIR light source(s) 230 may be positioned in the HMD 200 (e.g., around the eye lenses 220, or elsewhere in the HMD 200) to illuminate the user's eyes 292 with IR or NIR light. The eye tracking cameras 240 receive a portion of IR or NIR light reflected directly from the eyes 292 or via reflection off of one or more mirrors (not shown). In some embodiments, the display 210 emits light in the visible light range and does not emit light in the IR or NIR range, and thus does not introduce noise in the gaze tracking system. Note that the location and angle of eye tracking cameras 240 is given by way of example, and is not intended to be limiting. While FIG. 2 shows a single eye tracking camera 240 located on each side of the user 290's face, in some embodiments there may be two or more NIR cameras 240 on each side of the user 290's face. For example, in some embodiments, a camera 240 with a wider field of view (FOV) and a camera 240 with a narrower FOV may be used on each side of the user's face. As another example, in some embodiments, a camera 240 that operates at one wavelength (e.g. 850 nm) and a camera 240 that operates at a different wavelength (e.g. 940 nm) may be used on each side of the user's face.

Embodiments of the HMD 200 with a gaze tracking system as illustrated in FIG. 2 may, for example, be used in augmented or mixed reality (AR) applications to provide augmented or mixed reality views to the user 290. Embodiments of the HMD 200 with a gaze tracking system as illustrated in FIG. 2 may also be used in virtual reality (VR) applications to provide VR views to the user 290. In these embodiments, the controller 260 of the HMD 200 may render or obtain virtual reality (VR) frames that include virtual content, and the rendered frames may be provided to the projection system of the HMD 200 for display on display 210.

Figure 3:
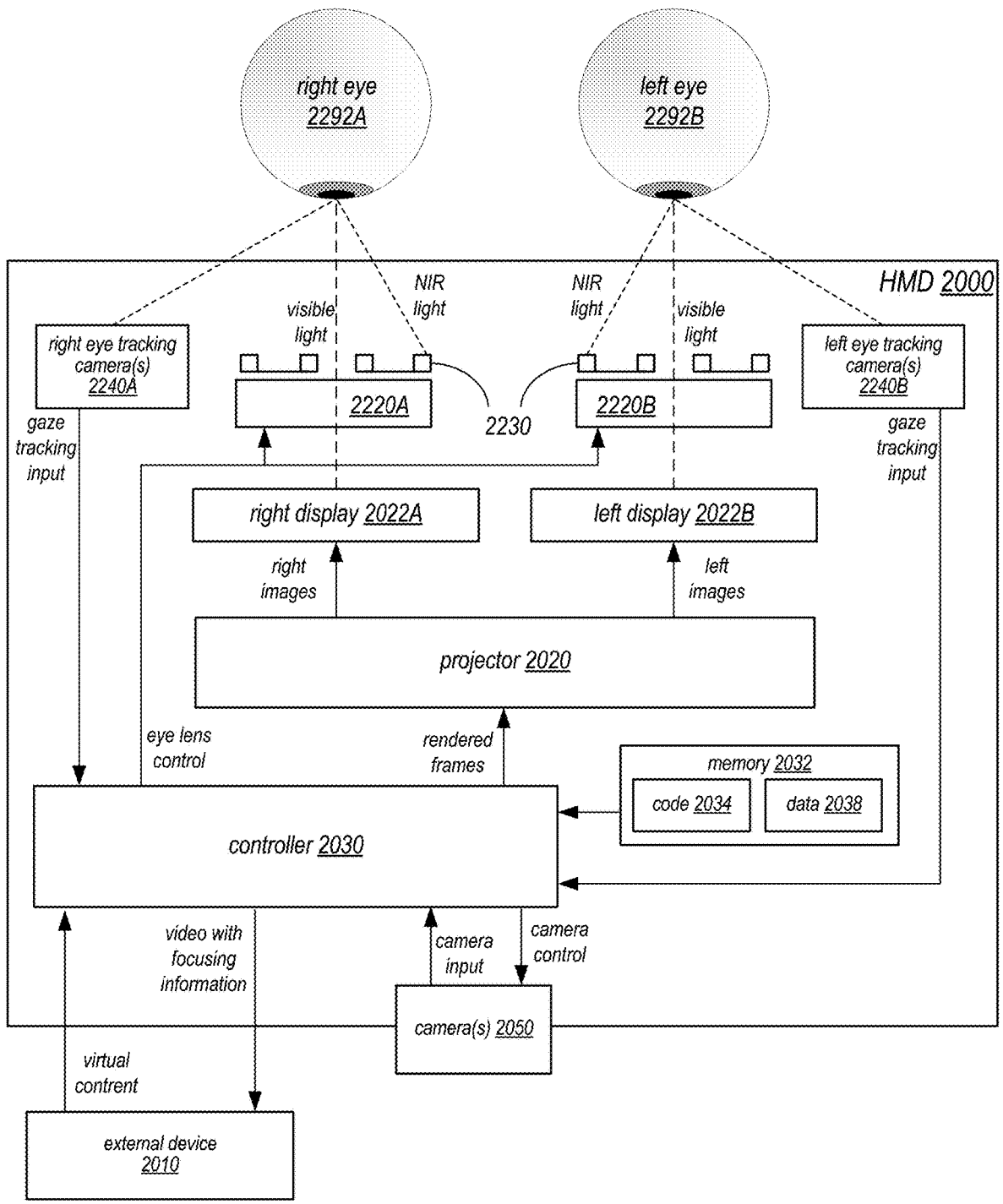
FIG. 3 is a block diagram illustrating components of an example VR/AR system that includes a gaze tracking system, according to some embodiments.

The controller 260 may be implemented in the HMD 200, or alternatively may be implemented at least in part by an external device (e.g., a computing system) that is communicatively coupled to HMD 200 via a wired or wireless interface. The controller 260 may include one or more of various types of processors, image signal processors (ISPs), graphics processing units (GPUs), coder/decoders (codecs), and/or other components for processing and rendering video and/or images. The controller 260 may render frames (each frame including a left and right image) that include virtual content based on inputs obtained from the cameras 250 and/or from one or more external sources, and may provide the frames to a projection system of the HMD 200 for display to display 210. FIG. 3 further illustrates components of an example HMD and VR/AR system, according to some embodiments.

The controller 260 may receive gaze tracking information (e.g., captured images of the user's eyes) from the eye tracking cameras 240 and analyze the information to determine the user 290's current gaze direction. For AR applications, as illustrated in FIGS. 1A and 1B, the controller 260 may use the gaze tracking information obtained from the gaze tracking system to direct the autofocus mechanism of the external cameras 250 to focus in the direction of the user 290's gaze so that the external cameras 250 focus on objects in the environment at which the user 290's is currently looking. For AR or VR applications, as illustrated in FIGS. 1C and 1E, the eye lenses 220 may be focusable lenses, and the controller 260 may use the gaze tracking information to adjust the focus of the eye lenses 220 so that the virtual content that the user 290 is currently looking at has the proper vergence to match the convergence of the user 290's eyes 292.

FIG. 3 is a block diagram illustrating components of an example VR/AR system that includes a gaze tracking system as described herein, according to some embodiments. In some embodiments, a VR/AR system may include an HMD 2000 such as a headset, helmet, goggles, or glasses. HMD 2000 may implement any of various types of virtual reality projector technologies. For example, the HMD 2000 may include a VR projection system that includes a projector 2020 that displays frames including left and right images on screens or displays 2022A and 2022B that are viewed by a user through eye lenses 2220A and 2220B. The VR projection system may, for example, be a DLP (digital light processing), LCD (liquid crystal display), or LCoS (liquid crystal on silicon) technology projection system. To create a three-dimensional (3D) effect in a 3D virtual view, objects at different depths or distances in the two images may be shifted left or right as a function of the triangulation of distance, with nearer objects shifted more than more distant objects. Note that other types of projection systems may be used in some embodiments.

In some embodiments, HMD 2000 may include a controller 2030 that implements functionality of the VR/AR system and to generate frames (each frame including a left and right image) that are displayed by the projector 2020. In some embodiments, HMD 2000 may also include a memory 2032 that stores software (code 2034) of the VR/AR system that is executable by the controller 2030, as well as data 2038 that may be used by the VR/AR system when executing on the controller 2030. In some embodiments, HMD 2000 may also include one or more interfaces (e.g., a Bluetooth technology interface, USB interface, etc.) that communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, handheld computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) that implement any suitable instruction set architecture, and may execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores that each execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more external cameras 2050 that capture video of the user's environment for AR applications. In some embodiments, the cameras 2050 may be equipped with autofocus mechanisms. While not shown, in some embodiments, the HMD 2000 may also include one or more sensors that collect information about the user's environment and actions (depth information, lighting information, user motions and gestures, etc.). The cameras 2050 and sensors may provide the information to the controller 2030 of the VR/AR system.

As shown in FIG. 3, HMD 2000 may be positioned on the user's head such that the displays 2022A and 2022B and eye lenses 2220A and 2220B are disposed in front of the user's eyes 2292A and 2292B. IR or NIR light sources 2230A and 2230B (e.g., IR or NIR LEDs) may be positioned in the HMD 2000 (e.g., around the eye lenses 2220A and 2220B, or elsewhere in the HMD 2000) to illuminate the user's eyes 2292A and 2292B with IR or NIR light. Eye tracking cameras 2240A and 2240B (e.g., IR or NIR cameras, for example 400×400 pixel count cameras) are located at each side of the user's face, for example at or near the user's cheek bones. Note that the location of eye tracking cameras 2240A and 2240B is given by way of example, and is not intended to be limiting. In some embodiments, there may be a single eye tracking camera 2240 located on each side of the user's face. In some embodiments there may be two or more eye tracking cameras 2240 on each side of the user's face. For example, in some embodiments, a wide-angle camera 2240 and a narrower-angle camera 2240 may be used on each side of the user's face. A portion of IR or NIR light emitted by light sources 2230A and 2230B reflects off the user's eyes 2292A and 2292B either directly to respective eye tracking cameras 2240A and 2240B or via mirrors located between the user's eyes 2292 and the displays 2022, and is captured by the eye tracking cameras 2240A and 2240B to image the user's eyes 2292A and 2292B. Gaze tracking information captured by the cameras 2240A and 2240B may be provided to the controller 2030. The controller 2030 may analyze the gaze tracking information (e.g., images of the user's eyes 2292A and 2292B) to determine eye position and movement, pupil dilation, or other characteristics of the eyes 2292A and 2292B.

The gaze tracking information obtained and analyzed by the controller 2030 may be used by the controller in performing various VR or AR system functions. For example, the point of gaze on the displays 2022A and 2022B may be estimated from images captured by the eye tracking cameras 2240A and 2240B. The estimated point of gaze may, for example, be used to direct the autofocus mechanism of the external cameras 2050 to focus in the direction of the user's gaze so that the external cameras 2050 focus on objects in the environment at which the user is currently looking, for example as illustrated in FIGS. 1A and 1B. As another example, the estimated point of gaze may be used in directing the eye lenses 2220 to adjust focus for a displayed virtual object that the user is looking at so that the virtual object appears to the user at the correct vergence distance, for example as illustrated in FIGS. 1C and 1E. Other applications of the gaze tracking information may include, but are not limited to, gaze-based interaction with content shown on the displays 2022A and 2022B, creation of eye image animations used for avatars in a VR or AR environment.

In some embodiments, the HMD 2000 may render and display frames to provide an augmented or mixed reality (AR) view for the user at least in part according to camera 2050 inputs. The AR view may include renderings of the user's environment, including renderings of real objects in the user's environment, based on video captured by one or more video cameras 2050 that capture high-quality, high-resolution video of the user's environment for display.

In some embodiments, HMD 2000 may have external cameras 2050 linked to closed circuit display panels 2022 via controller 2030. Note that the external cameras 2050 may be attached to the HMD 2000, or alternatively may be at a remote location for telepresence applications. The external cameras 2050 may include an autofocus mechanism that allows the cameras 2050 to automatically focus on objects or surfaces in the environment. In conventional HMDs, the autofocus mechanism may focus on something that the user is not looking at. In embodiments of an HMD 2000 as described herein, for AR applications, the controller 2030 may use the gaze tracking information obtained from the eye tracking cameras 2340 to direct the autofocus mechanism of the external cameras 2050 to focus in the direction of the user's gaze so that the external cameras 2050 focus on objects in the environment at which the user is currently looking. The controller 2030 may estimate the user's point of gaze on the display based on the gaze tracking information obtained from the eye tracking cameras 2340. The point of gaze estimated from the information captured by the eye tracking cameras 2340 may be used to determine the direction in which the user is looking. The controller 2030 may then direct the external cameras 2030 to focus in the determined direction. The autofocus mechanism of the external cameras 2030 may then focus the camera lenses on an object or surface in the environment that the user is currently looking at via displays 2022.

In some embodiments, the eye lenses 2220 can be focused to adjust the display vergence to agree with focus of the external cameras 2050. For example, in an HMD 2000 with external cameras 2050 that provide a closed circuit video feed to the display panels 2022, if the external cameras 2050 are focusing on a near object, the eye lenses 2220 can be adjusted to generate near vergence. In some embodiments, the controller 2030 may direct the external cameras 2050 to focus in the direction determined from the gaze tracking information. The controller 2030 may obtain focus information as feedback from the autofocus mechanism of the external cameras 2050, and use this focus information to determine distance of an object that the user is looking at. The controller 2030 may then direct the eye lenses 2220 to adjust focus according to the determined distance.

In some embodiments, an AR view provided by HMD 2000 may also include virtual content (e.g., virtual objects, virtual tags for real objects, avatars of the user, etc.) generated or obtained by the VR/AR system and composited with the projected view of the user's real environment. In some embodiments, the gaze tracking information may be applied to both the live video of the environment captured by the external cameras 2050 and the overlaid virtual content to determine the focus positions that provide correct vergence. For example, if the overlaid virtual content is at a virtual distance that is closer than the real object distance, the eye lenses 2220 may be adjusted to the vergence of the virtual content. The controller 2030 may obtain distance information for virtual content to be overlaid on the user's view of the real environment, and may use this distance information to direct the eye lenses 2220 to adjust focus according to the distance of virtual content that the user is currently looking towards according to the gaze tracking information.

Embodiments of the HMD 2000 as illustrated in FIG. 3 may also be used in virtual reality (VR) applications to provide VR views to the user. In these embodiments, the controller 2030 of the HMD 2000 may render or obtain virtual reality (VR) frames that include virtual content, and the rendered frames may be provided to the projector 2020 of the HMD 2000 for display to displays 2022A and 2022B. For VR applications, the controller 2030 may obtain distance information for virtual content to be displayed on the display panels 2022, and may use this distance information to direct the eye lenses 2220 to adjust focus according to the distance of virtual content that the user is currently looking at according to the gaze tracking information.

Embodiments of the HMD 2000 as illustrated in FIG. 3 may also be used to play back recorded AR or VR sessions. In some embodiments, adjusting focus of the eye lenses of the HMD to provide correct vergence for content that the user is looking at as determined from the gaze tracking information may be applied during the playback of recorded video. In some embodiments, for example, the controller 2030 may record video of a session to an external device 2010. Focus information may be recorded with the video. During playback of the video to HMD 2000, the gaze tracking information collected by the eye tracking cameras 2240 may be used to determine the direction of the user's gaze, and the gaze direction can be used to determine depth at the place where the user's gaze is directed. The eye lenses 2220 can then be adjusted to provide the appropriate vergence for the part of the scene that the user is looking at.

For example, in some embodiments of an AR system as described herein, an AR session may be recorded as a video stream, for example to an external device 2010, for later playback. The external camera 2050 focus information may be recorded with the video stream. During playback of the video to HMD 2000, the user's gaze may be tracked, and the recorded external camera 2050 focus information may be used to adjust the focus of the eye lenses 2220 to provide the correct vergence for displayed objects. Note that this method may be applied to any video recorded for viewing by an HMD 2000 as described herein; camera focus information may be recorded with the video, and used by the HMD 2000 to provide correct vergence for objects that appear in the video.

In some embodiments, instead of or in addition to recording camera focus information with a recorded video stream, eye lens 2220 focus information may be recorded with the video stream; the eye lens 2220 focus information may then be used during playback to provide correct vergence for objects that appear in the video.

Figure 4:
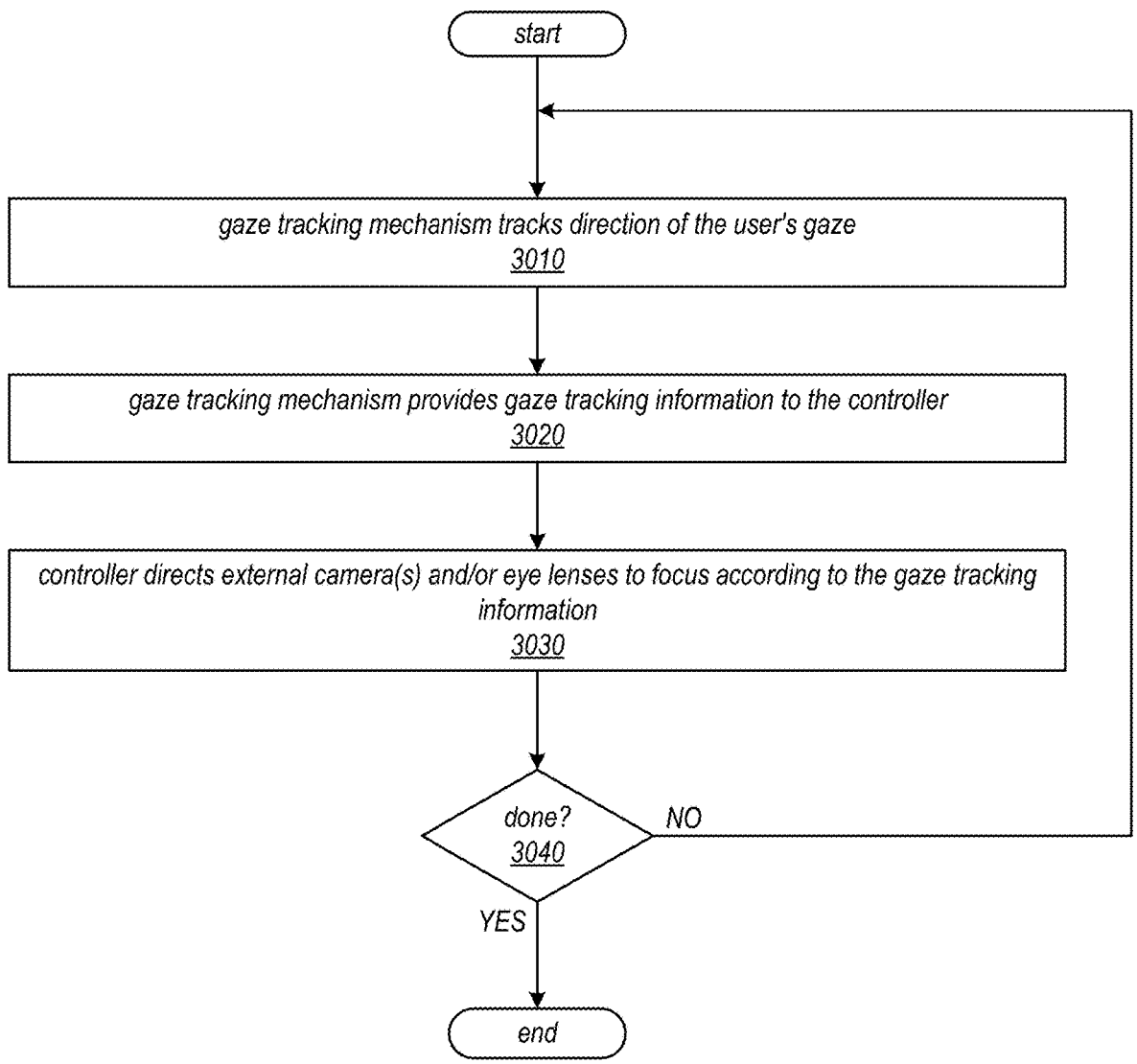
FIG. 4 is a high-level flowchart illustrating a method of operation of a VR/AR HMD that uses gaze tracking information to adjust focus during display of AR or VR content as illustrated in FIGS. 1A through 3, according to some embodiments.

FIG. 4 is a high-level flowchart illustrating a method of operation of a VR/AR HMD that uses gaze tracking information to adjust focus during display of AR or VR content as illustrated in FIGS. 1 through 3, according to some embodiments. As indicated at 3010, a gaze tracking mechanism of the HMD tracks direction of the user's gaze. As indicated at 3020, the gaze tracking mechanism provides gaze tracking information, for example captured images of the user's eyes, to the controller of the HMD. As indicated at 3030, the controller directs the external camera(s) of the HMD and/or the eye lenses of the HMD to focus according to the gaze tracking information. For AR applications, the controller may use the gaze tracking information obtained from the gaze tracking system to direct the autofocus mechanism of the external cameras to focus in the direction of the user's gaze so that the external cameras focus on objects in the environment at which the user is currently looking. For AR or VR applications, the eye lenses may be focusable lenses, and the HMD may use the gaze tracking information to adjust the focus of the eye lenses so that the virtual content that the user is currently looking at has the proper vergence to match the convergence of the user's eyes. The arrow returning from element 3040 to element 3010 indicates that the method may be a continuous process as long as the user is using the HMD.

Figure 5:
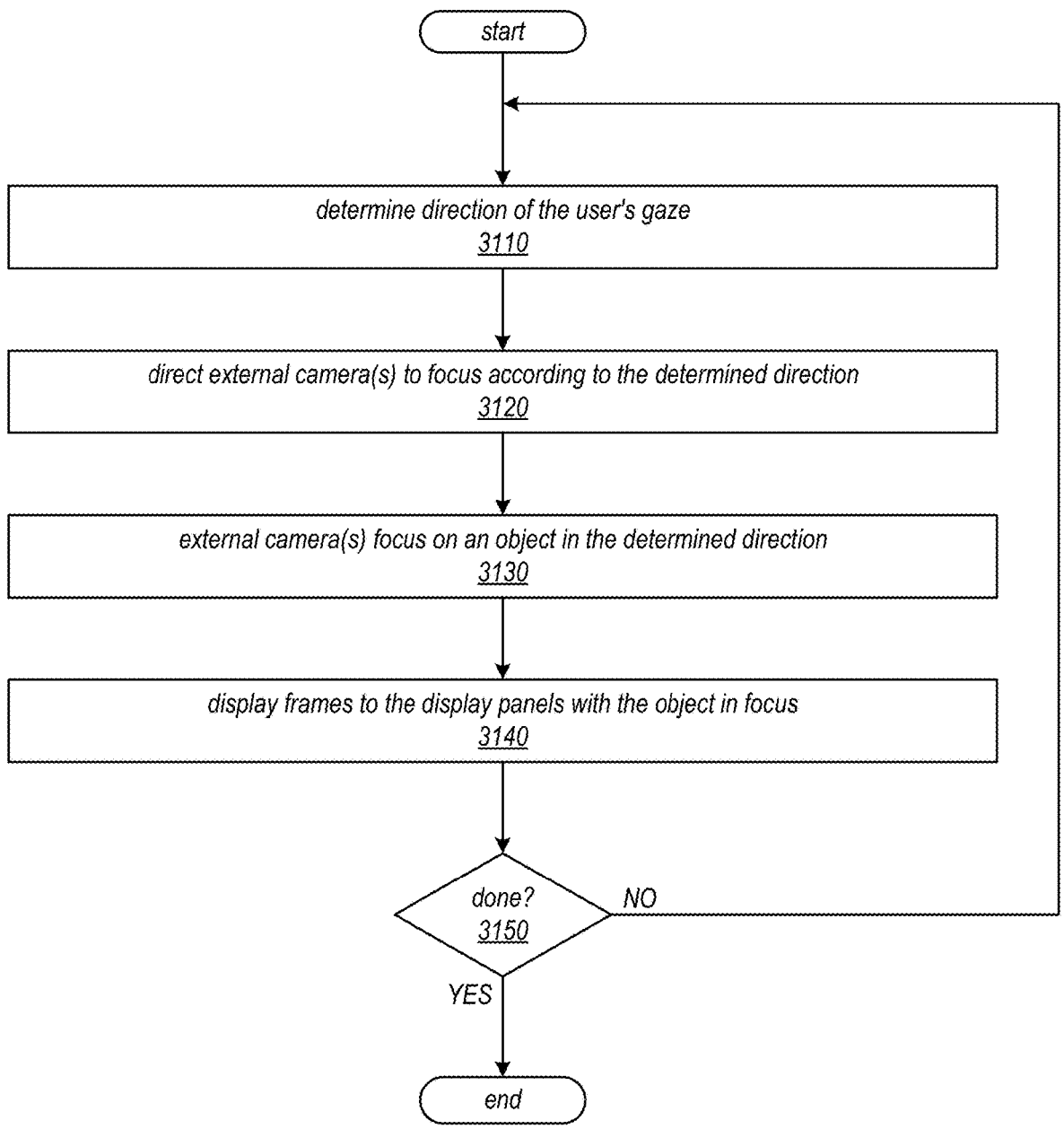
FIG. 5 is a flowchart illustrating a method for using gaze tracking information to direct external camera focusing in AR applications as illustrated in FIGS. 1A and 1B, according to some embodiments.

FIG. 5 is a flowchart illustrating a method for using gaze tracking information to direct external camera focusing in AR applications as illustrated in FIGS. 1A and 1B, according to some embodiments. As indicated at 3110, the controller of the HMD determines direction of the user's gaze. In some embodiments, eye tracking cameras of the HMD capture images of the user's eyes, and provide gaze tracking information, for example at least some of the captured images of the user's eyes, to the controller of the HMD. The controller may then analyze the gaze tracking information (e.g., one or more images of the user's eyes) to determine a current direction that the user is looking. As indicated at 3120, the controller may then direct external camera(s) of the HMD to focus in the determined direction. As indicated at 3130, the external camera(s) focus on an object in the determined direction. As indicated at 3140, the HMD displays frames to the display panels with the object in focus. The arrow returning from element 3150 to element 3110 indicates that the method may be a continuous process as long as the user is using the HMD.

Figure 6:
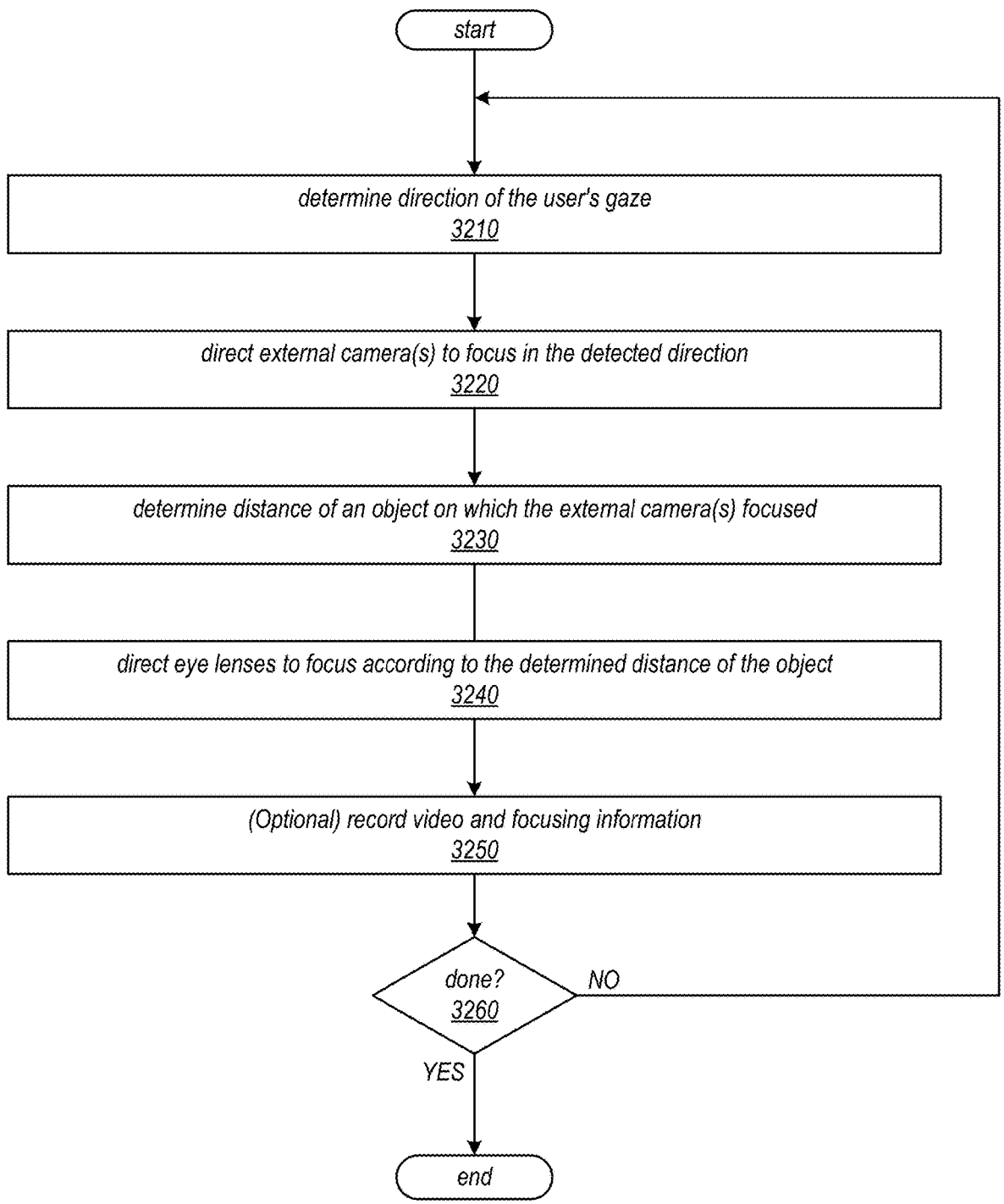
FIG. 6 is a flowchart illustrating a method for using gaze tracking information to direct eye lens focusing in AR applications as illustrated in FIG. 1C, according to some embodiments.

FIG. 6 is a flowchart illustrating a method for using gaze tracking information to direct eye lens focusing in AR applications as illustrated in FIG. 1C, according to some embodiments. As indicated at 3210, the controller of the HMD determines direction of the user's gaze. In some embodiments, eye tracking cameras of the HMD capture images of the user's eyes, and provide gaze tracking information, for example at least some of the captured images of the user's eyes, to the controller of the HMD. The controller may then analyze the gaze tracking information (e.g., one or more images of the user's eyes) to determine a current direction that the user is looking. As indicated at 3220, the controller may then direct external camera(s) of the HMD to focus in the determined direction. The external camera(s) may then focus on an object in the determined direction. As indicated at 3230, the controller may then determine the distance of the object on which the external camera(s) focused. For example, the external cameras may feedback focus information to the controller, and the controller may calculate the distance based on the focus information. As indicated at 3240, the controller may then direct the eye lenses of the HMD to focus according to the determined distance of the object on which the external cameras have focused.

As indicated at 3250, the HMD may record video of the AR session along with focus information for the eye lenses. The focus information may be used to adjust focus of the eye lenses during playback of the recorded video.

The arrow returning from element 3260 to element 3210 indicates that the method may be a continuous process as long as the user is using the HMD.

Figure 7:
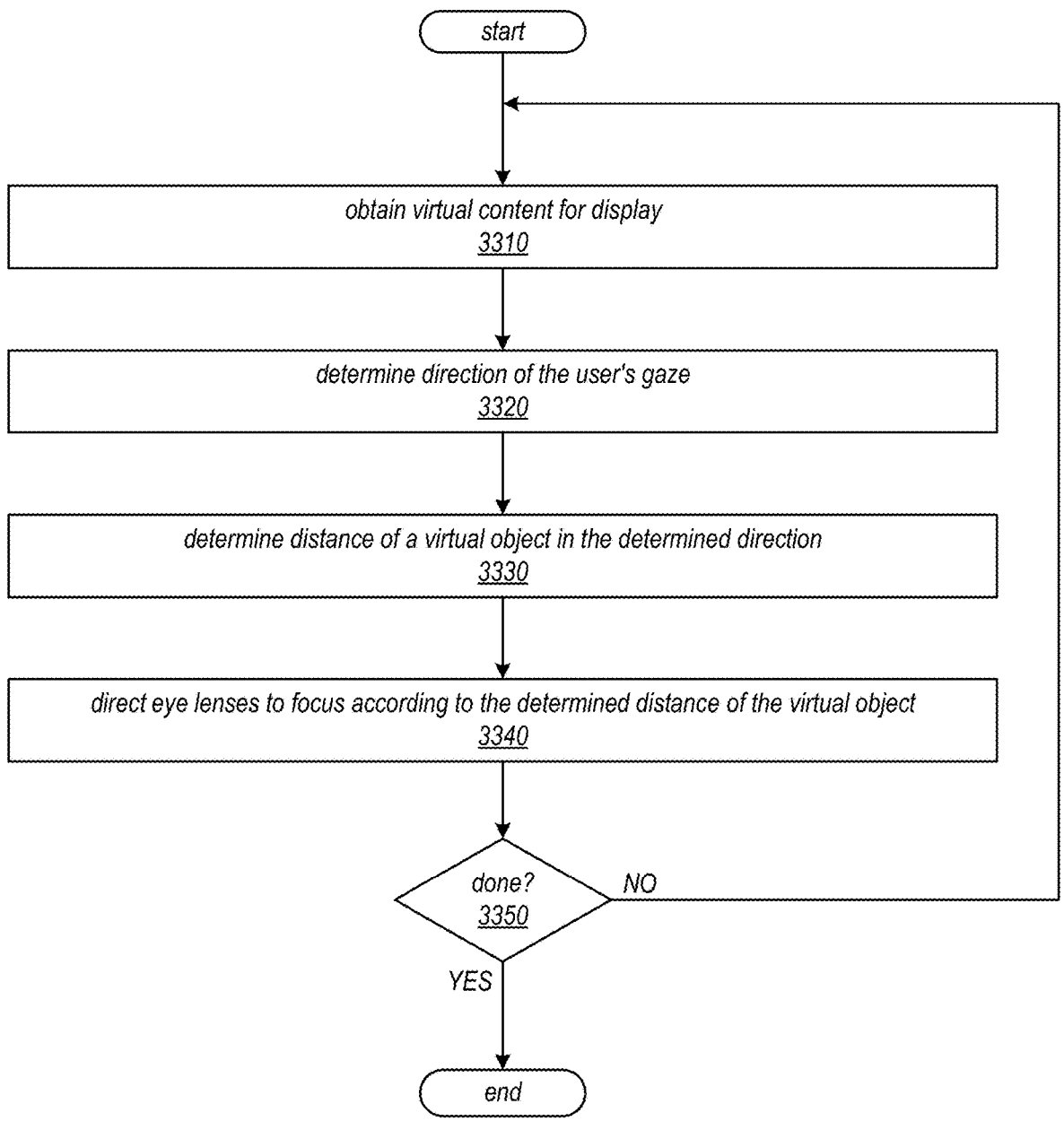
FIG. 7 is a flowchart illustrating a method for using gaze tracking information to direct eye lens focusing in VR applications as illustrated in FIG. 1E, according to some embodiments.

FIG. 7 is a flowchart illustrating a method for using gaze tracking information to direct eye lens focusing in VR applications as illustrated in FIG. 1E, according to some embodiments. As indicated at 3310, the controller of the HMD may obtain virtual content for display. The virtual content may be generated by the HMD, or alternatively may be received from one or more external sources. The virtual content may include virtual objects that are intended to be displayed at different depths in a scene, and may include information about the virtual objects including but not limited to location and depth information for the objects.

As indicated at 3320, the controller of the HMD determines direction of the user's gaze. In some embodiments, eye tracking cameras of the HMD capture images of the user's eyes, and provide gaze tracking information, for example at least some of the captured images of the user's eyes, to the controller of the HMD. The controller may then analyze the gaze tracking information (e.g., one or more images of the user's eyes) to determine a current direction that the user is looking.

As indicated at 3330, the controller may determine distance of a virtual object being displayed in the determined direction. For example, the controller may determine what object the user is looking at in the determined direction according to location information for the object in the scene, and then determine distance of the object from its depth information in the scene. As indicated at 3340, the controller may then direct the eye lenses of the HMD to focus according to the determined distance of the virtual object that the user is looking at.

The arrow returning from element 3350 to element 3310 indicates that the method may be a continuous process as long as the user is using the HMD.

Figure 8:
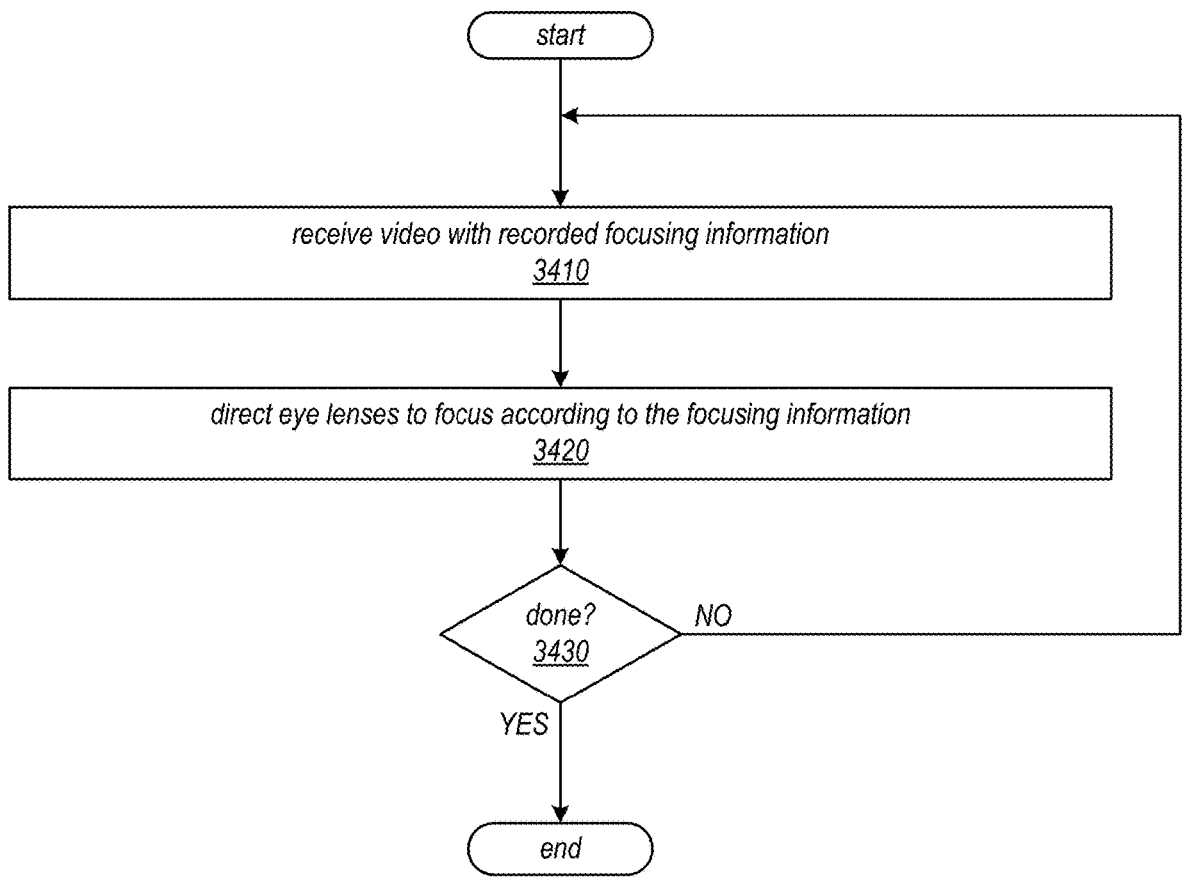
FIG. 8 is a flowchart illustrating a method for eye lens focusing during playback of recorded AR sessions, according to some embodiments.

FIG. 8 is a flowchart illustrating a method for eye lens focusing during playback of recorded AR sessions, according to some embodiments. As indicated at 3410, the controller may receive video of a recorded AR session along with recorded focus information from the session. As indicated at 3420, the controller may then direct the eye lenses to focus according to the focus information as the video is being played back.

The arrow returning from element 3430 to element 3410 indicates that the method may be a continuous process as long as the user is playing back the video using the HMD.

Figure 9:
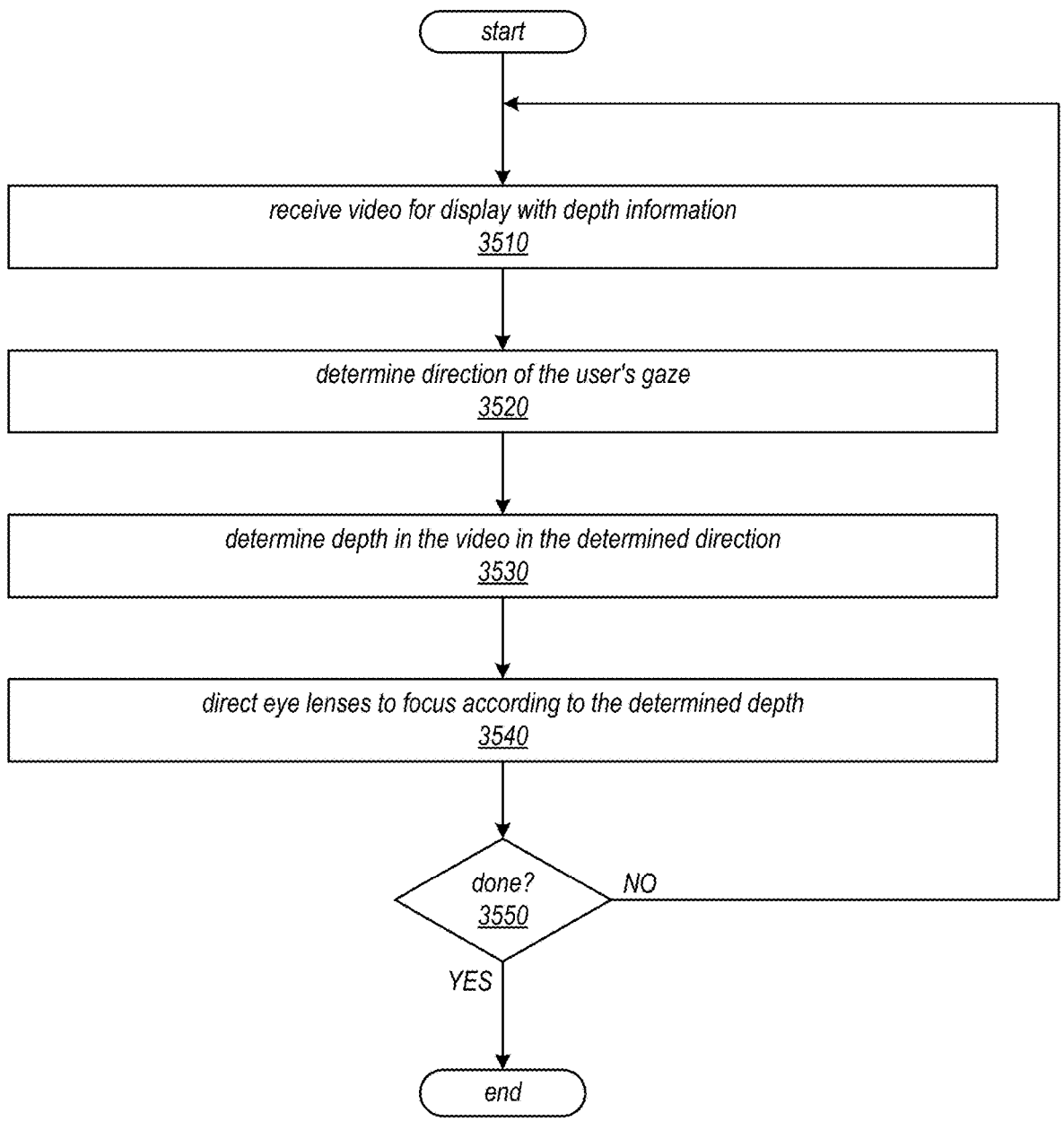
FIG. 9 is a flowchart illustrating a method for eye lens focusing when viewing video with depth information, according to some embodiments.

FIG. 9 is a flowchart illustrating a method for eye lens focusing when viewing video with depth information, according to some embodiments. As indicated at 3510, the controller of the HMD may receive video for display that includes depth information for content in scenes of the video, for example depth maps for the frames in the video.

As indicated at 3520, the controller of the HMD determines direction of the user's gaze as the video is being viewed. In some embodiments, eye tracking cameras of the HMD capture images of the user's eyes, and provide gaze tracking information, for example at least some of the captured images of the user's eyes, to the controller of the HMD. The controller may then analyze the gaze tracking information (e.g., one or more images of the user's eyes) to determine a current direction that the user is looking.

As indicated at 3530, the controller may determine depth of content in the video in the determined direction according to the depth information for content in the current scene. As indicated at 3550, the controller may then direct the eye lenses of the HMD to focus according to the determined distance of the content that the user is looking at.

The arrow returning from element 3550 to element 3510 indicates that the method may be a continuous process as long as the user is using the HMD.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a head-mounted display (HMD) that displays visual content for viewing by a user, wherein the HMD comprises:
one or more external cameras that capture video of an environment;
at least one display panel that displays frames of visual content based on the video of the environment captured by the one or more external cameras for viewing by the user;
left and right optical lenses located between the at least one display panel and the user's left and right eyes; and
a gaze tracking system comprising left and right eye tracking cameras that capture infrared or near-infrared light reflected by the user's eyes; and
a controller comprising one or more processors, wherein the controller:
obtains gaze tracking information from the gaze tracking system;
determines direction of the user's gaze from the gaze tracking information;
determines distance of an object in the environment in the determined direction of the user's gaze, wherein the object is displayed in the visual content on the at least one display panel; and
directs the left and right optical lenses to adjust focus according to the determined distance so that optical vergence of the displayed object matches convergence of the user's eyes.

2. The system as recited in claim 1, wherein the gaze tracking information includes one or more of eye position, eye movement, or pupil dilation.

3. The system as recited in claim 1, wherein the visual content includes views of the environment as captured by the one or more external cameras to provide an augmented reality view to the user.

4. The system as recited in claim 3, wherein the controller directs the one or more external cameras to focus in the determined direction of the user's gaze.

5. The system as recited in claim 4,
wherein the one or more external cameras:
focus on the object in the environment in the determined direction of the user's gaze; and
provide feedback to the controller including focus information for the object;
wherein, to determine distance of the object in the determined direction of the user's gaze, the controller determines the distance according to the focus information for the object.

6. The system as recited in claim 1, wherein the visual content includes virtual content obtained from one or more sources to provide a virtual reality view including a second displayed object to the user, wherein the second displayed object corresponds to a virtual object in the virtual reality view, and wherein the controller determines distance of the second displayed object according to depth information for the virtual object in the virtual reality view and directs the left and right optical lenses to adjust the focus according to the determined distance of the second displayed object so that optical vergence of the second displayed object matches the convergence of the user's eyes.

7. The system as recited in claim 1, wherein the left and right optical lenses form a virtual image of the frames displayed by the at least one display panel at a distance at or near optical infinity of the optical lenses, and wherein, to direct the left and right optical lenses to adjust focus according to the determined distance, the controller directs the optical lenses to reduce refractive power so that the object appears to the user to be at the determined distance instead of at optical infinity.

8. The system as recited in claim 1, wherein the controller:
records the frames of visual content to generate a recorded video; and
stores focus information with the recorded video, wherein the focus information includes determined distances of one or more objects in the visual content of the frames.

9. The system as recited in claim 1, wherein the visual content includes frames of a video being played back by the HMD, wherein focus information for objects that appear in the video is recorded with the video, and wherein, to determine distance of the object in the determined direction of the user's gaze, the controller determines the distance according to recorded focus information for the object in the video.

10. A method, comprising:
obtaining, by a controller of a head-mounted display (HMD), gaze tracking information from left and right eye tracking cameras of the HMD;
determining, by the controller, direction of a user's gaze from the gaze tracking information;
directing, by the controller, one or more external cameras that capture video of an environment for display by the HMD to focus in the determined direction of the user's gaze;
determining distance of a physical object in the environment in the determined direction of the user's gaze, wherein the physical object is displayed as a displayed object on at least one display panel of the HMD; and
directing left and right optical lenses of the HMD located between the at least one display panel and the user's left and right eyes to adjust focus according to the determined distance so that optical vergence of the displayed object matches convergence of the user's eyes.

11. The method as recited in claim 10, further comprising providing, by the external cameras, feedback to the controller including focus information for the physical object, wherein determining distance of the physical object in the determined direction of the user's gaze comprises determining the distance according to the focus information for the physical object obtained from the external cameras.

12. The method as recited in claim 10, wherein the left and right optical lenses form a virtual image of video frames displayed by the at least one display panel at a distance at or near optical infinity of the optical lenses, and wherein directing the left and right optical lenses to adjust focus according to the determined distance comprises directing the optical lenses to reduce refractive power so that the displayed object appears to the user to be at the determined distance instead of at optical infinity.

13. The method as recited in claim 10, further comprising:
providing, by the external cameras, feedback to the controller including focus information for the physical object;
recording, by the controller, the video of the environment captured by the external cameras; and
recording, by the controller, the focus information for the physical object with the recorded video.

14. The method as recited in claim 13, further comprising:
playing back, by the HMD, the recorded video for viewing by the user; and
directing left and right optical lenses of the HMD located between the at least one display panel and the user's left and right eyes to adjust focus according to the recorded focus information for the physical object when displaying the object corresponding to the physical object during playback of the recorded video so that optical vergence of the displayed object matches convergence of the user's eyes.

15. A method, comprising:
obtaining, by a controller of a head-mounted display (HMD), gaze tracking information from left and right eye tracking cameras of the HMD;
determining, by the controller, direction of a user's gaze from the gaze tracking information;
directing, by the controller, one or more external cameras that capture video of an environment for display by the HMD to focus in the determined direction of the user's gaze;
determining distance of an object in the environment in the determined direction of the user's gaze, wherein the object is displayed on at least one display panel of the HMD; and
directing left and right optical lenses of the HMD located between the display and the user's left and right eyes to adjust focus according to the determined distance so that optical vergence of the displayed object matches convergence of the user's eyes.

16. The method as recited in claim 15, wherein the one or more external cameras focus on the object in the environment in the determined direction of the user's gaze.

17. The method as recited in claim 15, further comprising providing, by the one or more external cameras, feedback to the controller including focus information for the object, wherein determining distance of the object in the determined direction of the user's gaze comprises determining the distance according to the focus information for the object obtained from the external cameras.

18. The method as recited in claim 15, wherein the HMD displays virtual content obtained from one or more sources to provide a virtual reality view including a second displayed object to the user, wherein the second displayed object corresponds to a virtual object in the virtual reality view, and wherein directing the left and right optical lenses of the HMD comprises adjusting the focus according to distance of the second displayed object in the determined direction of the user's gaze determined according to depth information for the virtual object in the virtual reality view so that optical vergence for the second displayed object matches the convergence of the user's eyes.

19. The method as recited in claim 15, wherein the left and right optical lenses form a virtual image of frames displayed by the at least one display panel at a distance at or near optical infinity of the optical lenses, and wherein directing the left and right optical lenses to adjust focus according to the determined distance comprises directing the optical lenses to reduce refractive power so that the object appears to the user to be at the determined distance instead of at optical infinity.

* * * * *